United States Patent [19]
Lilley et al.

[11] 3,773,476
[45] Nov. 20, 1973

[54] ELECTRICAL COMMUTATOR

[75] Inventors: Eugene A. Lilley, Virgil; J. Jones, Alton, both of Ill.

[73] Assignee: Olin Corporation, New Haven, Conn.

[22] Filed: Jan. 28, 1972

[21] Appl. No.: 221,734

Related U.S. Application Data

[62] Division of Ser. No. 8,666, Feb. 4, 1970.

[52] U.S. Cl. ................................ 29/196.3, 29/199
[51] Int. Cl. ............................................ B32b 15/00
[58] Field of Search .................................... 29/196.3

[56] References Cited
UNITED STATES PATENTS

| | | | |
|---|---|---|---|
| 3,165,828 | 1/1965 | Kennedy | 29/196.3 |
| 3,555,169 | 1/1971 | Miller | 29/196.3 |
| 3,112,185 | 11/1963 | Ochsner | 29/196.3 |
| 2,718,690 | 9/1955 | Ulam | 29/196.3 |
| 3,282,660 | 11/1966 | Pendleton | 29/196.3 |
| 3,560,172 | 2/1971 | Kench | 29/196.3 |

*Primary Examiner*—Hyland Bizot
*Attorney*—Robert H. Bachman et al.

[57] ABSTRACT

A new and improved electrical commutator comprising a plurality of spaced apart plates wherein said plates have at least one outwardly projecting finger for holding an armature wire and wherein the plates are a composite comprising a copper base alloy containing at least 0.0343 per cent by weight silver, balance essentially copper integrally bonded to a side of an iron base alloy.

2 Claims, 4 Drawing Figures

ELECTRICAL COMMUTATOR

This is a division of application Ser. No. 8,666, filed Feb. 4, 1970, now U.S. Pat. No. 3,659,130.

The present invention relates to a new and improved electrical commutator. More particularly, the present invention relates to a novel alloy composite having increased strength and weldability, as well as good formability, machineability and wearing characteristics.

At present many electrical devices such as commutators comprise an alloy of solid copper, such as oxygen free high conductivity copper, deoxidized low phosphorus copper, or low oxygen silver bearing copper.

The aforementioned materials are employed since in forming the hooks, or fingers, of the commutator severe deformation is required and these materials more easily deform without cracking since they are essentially free of oxide stringers.

Other properties which are important in the commutator art however, in addition to electrical conductivity, are machinability, wearability, formability, weldability, and strength.

More particularly, after shaping of the commutator, a machining operation is required in order to insure concentricity of the article, and generally about 10% to 15% of the thickness of the commutator is machined away. It is therefore important that the alloy possesses good machinability in respect to chip formation, etc.

Wearability is equally important since the motor brushes ride on the commutator surface and thereby a commutator surface is required which will insure good wearability of the brushes. Also, since it is essential that the commutator fingers do not break away during operation, high strength characteristics are particularly required of the material employed.

Naturally, also, the material to be employed must possess good weldability since the fingers of the commutator are bent over and then resistance welded to the magnet wire after winding of the armature.

It is therefore a principle object of the present invention to provide a new and improved commutator.

It is a still further object of the present to provide a commutator as aforesaid whereby the article is characterized by having increased strength and improved weldability as well as good wearability, machinability and formability.

In accordance with the present invention, it has now been found that the foregoing objects and advantages may be readily obtained.

The present invention overcomes the disadvantages of the art and is a single, convenient and highly useful article.

The present invention is an electrical commutator comprising a plurality of spaced apart plates electrically insulated from each other wherein the plates have at least one outwardly projecting finger for holding an armature wire, and further wherein the plates are a composite comprising a copper base alloy component containing at least 10 oz. per ton of silver, balance essentially copper, integrally bonded to a side of an iron base alloy. The aforementioned plates are positioned about a suitable bushing, such as a plastic, with the copper base alloy component facing outwardly.

The aforementioned silver content refers to troy ounces avoirdupois per short ton; and the preferred range is from 10–25 oz./ton.

Preferably but not necessarily, the aforementioned bonding of the composite should be in accordance with the methods of U.S. Pat. Nos. 3,318,364 and 3,381,365 which teach convenient methods for producing composite metal articles. For example, U.S. Pat. No. 3,381,365 teaches a method for preparing an iron base alloy core composite. It is difficult to produce a composite article having an iron base core or cladding due to the formation of both adherent and flaky oxides at moderate or elevated temperatures necessary for hot rolling. This oxide layer frequently tends to break open during hot rolling but still can and often does cause severe problems. Briefly, the process described in the aforementioned U.S. Pat. No. 3,381,365 provides for heating the core, of a thickness less than 0.50 inch, to a temperature between 300° and 1350°F, rolling together said core and cladding at a speed of at least 100 ft. per minute in one pass at a reduction range between 35 percent to 75 percent with said core cladding coming together for the first time in the bite of the rolls, said cladding of a thickness less than 0.125 inch and contacting the roll prior to contacting of the core. It is necessary that the included angle between the core and the cladding is in excess of 5° upon entering the rolls, with the preferred angle in excess of 10°. An angle in excess of 10° will incure that the cladding and the core do not come together earlier than in the bite of the rolls.

Upon entering the rolls, the cladding and the rolls are traveling at different linear speeds whereas upon exiting from the rolls they are going at the same speed due to reduction in thickness of the composite. The difference in traveling speeds between the rolls and the cladding in combination with the pre-contacting of the cladding and the rolls generates a shear strain and introduces shearing at the bite of the rolls and the core cladding interface. The shearing strain at this interface results in turbulent material flow thereby causing more intimate bonding by increasing the interfacial linear surface of the composite by at least 20 percent. It is further noted that the interfacial surface between the core and cladding is characterized by the absence of interatomic diffusion between the core and cladding material.

Naturally, other methods of bonding cladding to an iron or copper base alloy core may also be employed.

Figure 1:
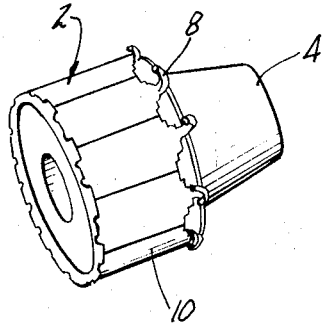
FIG. 1 is a perspective view of the commutator before welding.
Figure 2:
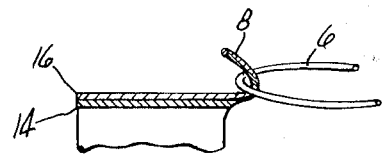
FIG. 2 is an enlarged elevated view of a commutator finger after being wound about with an armature wire.

FIG. 1 shows the commutator 2 of the present invention mounted on a bushing 4 before winding with the armature wire 6. The fingers 8 are shown in the upright position and circumferentially spaced apart to form hooks for catching and holding the armature wire during winding, as shown in FIG. 2. After winding the wire about finger 8 the finger is then bent over to hold the wire as shown in FIG. 3.

The relative high strength of the iron base alloy component imparts increased strength to the fingers of the commutator bars 10 of the commutator 2. This is important since the high strength insures that the fingers 8 will not yield when the armature 12 is wound, i.e., when the armature wire 6 is hooked around the projecting fingers for should yielding occur the fingers 8 would require rebending; or failure may later occur in service due to a poor joint where the fingers are resistance welded to the armature wire 6.

Figure 3:
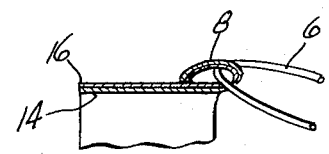
FIG. 3 is an enlarged elevational view of a commutator finger after winding and bending of the finger into position.
Figure 4:
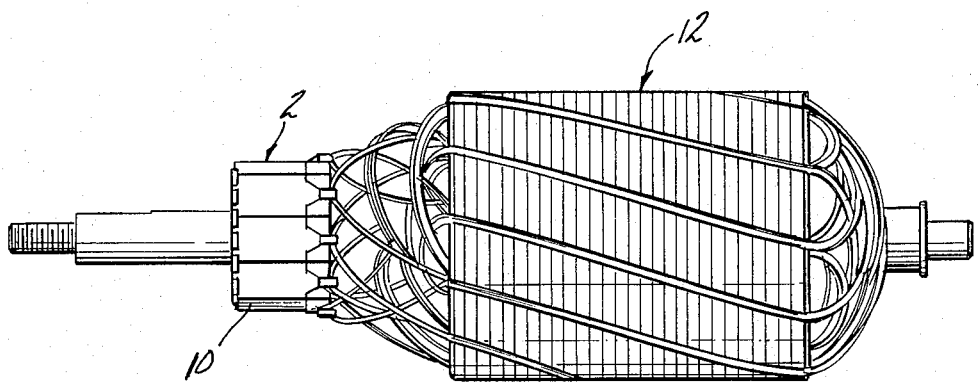
FIG. 4 is an elevational view of the commutator after installation with the armature, and welding of the commutator fingers.

In addition weldability is very important since the fingers 8 of the commutator must be welded to the armature wire 6 after the aforementioned winding and after they are bent over the wire, as shown in FIGS. 3 and 4. The iron base component 14, being significantly less conductive to heat than the copper component 16, prevents the heat generated from being rapidly carried away by the more conductive copper component. Thus, by providing for a greater amount of retained heat in the weld area more efficient and rapid welding is insured.

In accordance with the present invention any iron base alloy may be employed, i.e., any alloy containing a major proportion of iron. Typical iron base alloys which may be employed include but are not limited to the following: high purity iron, alloys of the iron carbon family, iron chromium family, iron-manganese family, iron-nickel family, and the iron-nickel chromium family, etc.

Typical alloying constituents include but are not limited to the following: carbon, aluminum, titanium, silicon, phosphorus, sulfur, chromium, nickel, zirconium and zinc.

The silver bearing copper alloy is a copper base alloy containing at least 10 oz./ton of silver, and generally from 10 to 25 oz./ton of silver, and naturally small amounts of elements may also be present in the copper base alloy as impurities, i.e., 0.2 maximum oxygen, 0.03 maximum zinc and total all other impurities 0.03 percent nominal. Although the silver content of silver bearing copper alloys is conventionally specified in terms of Troy ounces of silver per ton copper, the silver content may readily be expressed in per cent form by multiplying the Troy ounces per ton quantity by 0.00343.

Generally, but not necessarily the thickness of the article after bonding together to form a composite article and machining ranges from 0.030 to 0.060 inches in thickness with the copper base alloy comprising from about 40.0 percent to 60.0 percent of the thickness of the article, and preferably about 50 percent, with the iron base material as the remainder.

The present invention is thus an electrical commutator having improved weldability and strength as well as excellent machinability, formability and wear properties.

The present invention will be more readily apparent from the following illustrative example.

EXAMPLE

A copper base alloy containing about 15 oz./ton silver was clad on one side of S.A.E. 1010 carbon steel to form an integrally bonded composite. The steel component was 0.035 inch thick and the copper alloy component 0.035 inches thick after bonding together. The composite was then cold rolled to about 40 percent reduction and then annealed to effect recrystallization in both the steel and copper alloy components. The strip was then formed into a hollow commutator blank of seven-eighths inch diameter with a five-sixteenths inch contact surface. The blank was then filled with a plastic and then tumbled to remove any excess plastic material. The fingers were then formed, each about three-sixteenths inch long as measured from its base when in the flat condition and about one-sixteenth inch wide. After forming of the fingers the article was then broached to form the commutator bars, each about one-fourth inch wide, and then was assembled in a motor. The article was found to have improved weldability, and formability, as well as high strength, during the assembly operation.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An integrally bonded composite comprising:
   A. a copper base alloy component consisting essentially of from 0.0343 to 0.08575% silver, from 0.001 to 0.2% oxygen, from 0.001 to 0.03% zinc with the total of all other impurities being from 0.001 to 0.03%, balance copper, having a thickness of from 40 to 60% of the total composite thickness, and;
   B. an iron base alloy bonded to one side of the copper base alloy.

2. A composite according to claim 1 wherein said composite has a thickness of from 0.030 to 0.060 inch.

* * * * *